(12) United States Patent
Hathorn et al.

(10) Patent No.: US 8,971,176 B2
(45) Date of Patent: Mar. 3, 2015

(54) FIBRE CHANNEL OVER ETHERNET SWITCH IMPLICIT LOGOUT

(71) Applicant: International Business Machines Corporation, Armonk, NY (US)

(72) Inventors: Roger G. Hathorn, Tucson, AZ (US); Henry J. May, Rochester, MN (US); Christoph Raisch, Gerlingen (DE); Louis W. Ricci, Hyde Park, NY (US); Daniel Sentler, Magstadt (DE)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 13/630,331

(22) Filed: Sep. 28, 2012

(65) Prior Publication Data
US 2014/0092912 A1    Apr. 3, 2014

(51) Int. Cl.
*H04L 12/26* (2006.01)
*H04L 12/931* (2013.01)

(52) U.S. Cl.
CPC ............................ *H04L 49/351* (2013.01)
USPC ........................................... 370/218; 370/389

(58) Field of Classification Search
USPC ......... 370/216–221, 227–229, 235, 242–245, 370/363, 386, 389, 392, 401, 402, 428, 466, 370/474, 477; 455/428; 709/223, 224, 229
See application file for complete search history.

(56) References Cited

U.S. PATENT DOCUMENTS

| | | | |
|---|---|---|---|
| 7,386,608 B2 | 6/2008 | Tsai et al. | |
| 7,500,030 B2 | 3/2009 | Hathorn et al. | |
| 7,668,980 B2 | 2/2010 | Hathorn et al. | |
| 7,856,511 B2 | 12/2010 | Ricci et al. | |
| 8,621,095 B1* | 12/2013 | Desanti | 709/229 |
| 2006/0230220 A1 | 10/2006 | Yasuda et al. | |
| 2009/0052461 A1 | 2/2009 | Brown et al. | |
| 2009/0083447 A1 | 3/2009 | Hathorn et al. | |
| 2010/0097941 A1* | 4/2010 | Carlson et al. | 370/245 |
| 2011/0032933 A1 | 2/2011 | Eisenhauer et al. | |
| 2012/0039163 A1* | 2/2012 | Nakajima | 370/217 |
| 2012/0106957 A1 | 5/2012 | Willeke et al. | |
| 2012/0275301 A1* | 11/2012 | Xiong | 370/230 |

OTHER PUBLICATIONS

Claudio DeSanti et al. ; VA_Port Protocols, T11/11-225v0, Jun. 2011.*
De Santi et al., "Distributed FCF", T11/11-026v2, Jun. 2011, pp. 1-12. http://www.t11.org/ftp/t11/pub/fc/bb-6/11-026v2.pdf.
De Santi et al., "Distributed FCF", T11/11-026v3, Oct. 2011, pp. 1-11. http://www.t11.org/ftp/t11/pub/fc/bb-6/11-026v3.pdf.
De Santi et al., "VA_Port Protocols", T11/11-225v1, Oct. 2011, pp. 1-18. http://www.t11.org/ftp/t11/pub/fc/sw-6/11-225v1.pdf.
Hathorn et al., "Gateway Device to Connect Native Fibre Channel Ports to Pure Fibre Channel Over Ethernet Storage Area Networks", U.S. Appl. No. 13/534,086, filed Jun. 27, 2012.

* cited by examiner

*Primary Examiner* — Edan Orgad
*Assistant Examiner* — Saumit Shah
(74) *Attorney, Agent, or Firm* — Penny L. Lowry; Robert Sullivan

(57) ABSTRACT

A process for an implicit logout of links to a fiber channel over Ethernet switch includes receiving, at a second switch, a first message from a first switch. The first message indicates an implicit link logout event on one of two or more links between the first switch and a node. Also, the process includes transmitting a second message from the second switch. The second message indicates zoning information for all of the two or more links between the first switch and the node.

26 Claims, 4 Drawing Sheets ns to its physical ports in conjunction with the virtual ports.
FIBRE CHANNEL OVER ETHERNET SWITCH IMPLICIT LOGOUT

FIELD

This invention generally relates to fibre channel switches or fibre channel over Ethernet switches and more specifically implicit logouts of a fibre channel or fibre channel over Ethernet switches.

BACKGROUND

Fibre Channel is a high reliability, high speed network technology that is often used in storage networking, particularly in storage area network (SAN) environments. Many data centers use Fibre Channel (FC) for storage networking, and, in conjunction, use Ethernet for TCP/IP networks. As a result, the data center must maintain two separate networks. Fibre Channel over Ethernet (FCoE) is a network protocol that encapsulates FC frames in Ethernet frames in order to allow FC to be used over an Ethernet infrastructure. FCoE thus allows network traffic generated according to the FC protocol to share infrastructure with network traffic generated according to Ethernet protocols such as TCP/IP.

SUMMARY

In one embodiment, a process for an implicit logout of links to a fibre channel over Ethernet switch is described. The process includes receiving, at a second switch, a first message from a first switch. The first message indicates an implicit link logout event on one of two or more links between the first switch and a node. Also, the process includes transmitting a second message from the second switch. The second message indicates zoning information for all of the two or more links between the first switch and the node.

In another embodiment, another process for an implicit logout of links to a fibre channel over Ethernet switch is described. The process includes detecting an implicit link logout event on a link between a first switch and a node. The first switch and the node may have two or more links. The process may include sending a first message from the first switch to a second switch. The process may include receiving a second message from the second switch at the first switch. The second message indicaes zoning information for all of the two or more links between the first switch and the node.

In yet another embodiment, a computer readable storage medium having instructions stored thereon which, when executed, cause a processor to perform operations is described. The operations may be the two embodiments described above.

BRIEF DESCRIPTION OF THE DRAWINGS

Embodiments will be better understood from the following detailed description with reference to the drawings, in which.

DETAILED DESCRIPTION

Figure 1:
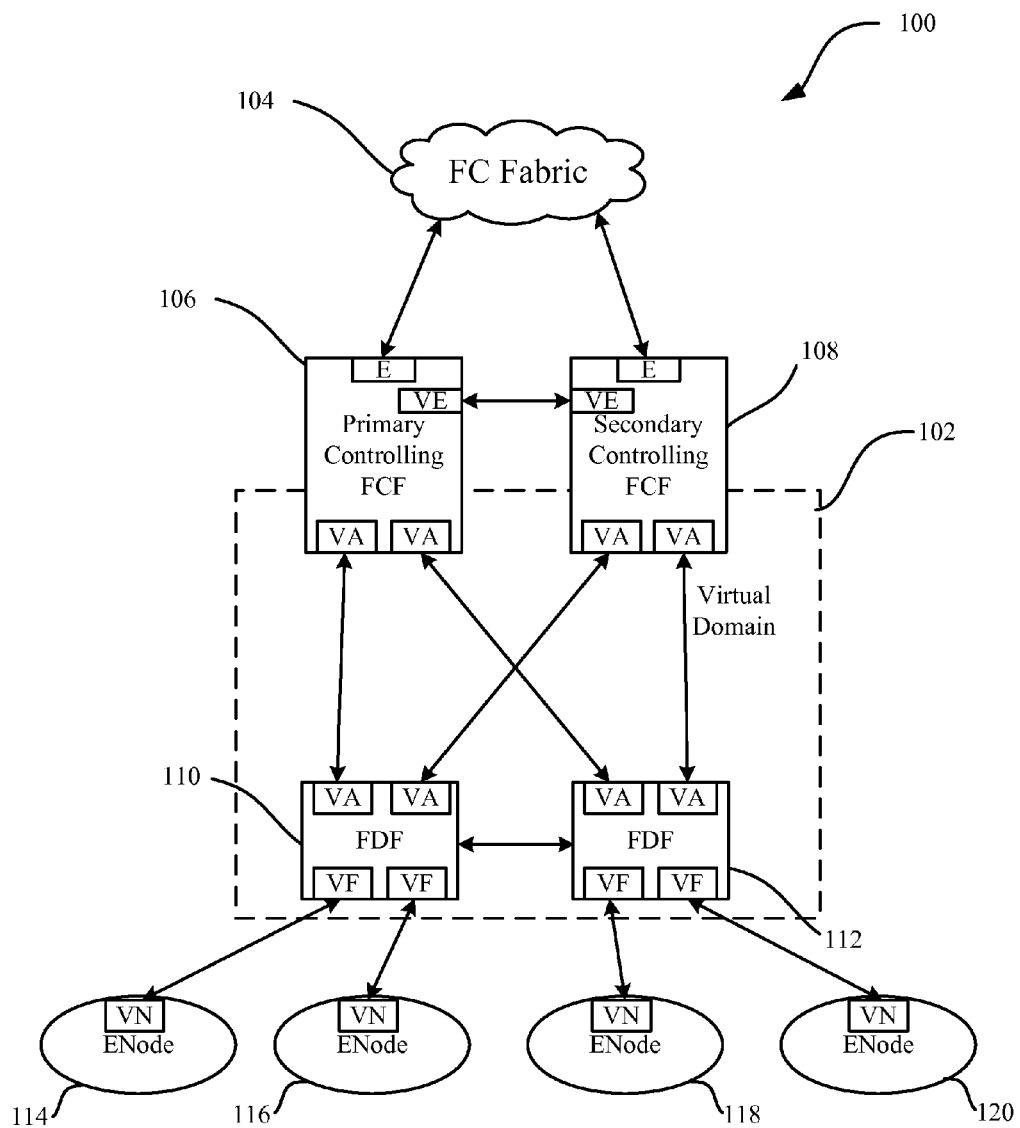
FIG. 1 is a block diagram of a storage network including Fibre Channel and Fibre Channel over Ethernet fabrics, according to one embodiment.

Referring to FIG. 1, a network 100 according to an embodiment is illustrated. The network 100 includes a Fibre Channel over Ethernet (FCoE) 102 portion and a Fibre Channel (FC) portion or FC Fabric 104. The FCoE 102 may be treated as a single virtual domain. FC fabric 104 may include one or more storage area network (SAN) environments. Connected to the FC fabric 104 may be FCoE switches such as FCoE forwarders (FCFs) 106 and 108. The FCFs 106, 108 form the interface between the FCoE 102 and the FC fabric 104. In one embodiment, only one FCF may be present in the network. In other embodiments, more than one FCF may present in the network 100. FCF 106 may be the primary controlling FCF. FCF 108 may be the redundant secondary controlling FCF. Connected to each of the FCFs are other fibre channel switches such as two FCoE data forwarders (FDFs) FDF 110 and FDF 112. There may be one or more than one FDF connected to the FCFs 106, 108. Also, the FDFs may cascade where other FDFs connect with FDFs 110, 112. Switches, in general, allow a device to send a message to another device for which the message was meant. For example, a FCF may forward translated FCoE frames over an enhanced Ethernet to devices of SAN. Fibre channel switches may implement zoning, a mechanism that disables unwanted traffic between certain fabric nodes.

Also, connected to FDFs 110, 112 are converged network adapters (CNAs), not shown, containing nodes such as ENodes 114, 116 and ENodes 118, 120, respectively. ENodes are FCoE nodes and are a combination of FCoE termination functions and FC stack on CNAs. They are generally equivalent to host bus adapters (HBAs) in native FC networks.

Each connected component of the network 100, such as FDFs and ENodes, may have different ports. The ENodes 114, 116, 118, 120 contain at least one virtual node port (VN_Port) designated as VN in FIG. 1. The VN_Port may connect to the FDFs 110, 112 at virtual fabric ports (VF_Port), designated as VF in FIG. 1. The connections between FCFs 106, 108 to the FDFs 110, 112 may be at virtual A_Ports (VA_Ports), designated as VA on FIG. 1, on the FCFs 106, 108 and the FDFs 110, 112. Virtual extension ports (VE_Port), designated as VE in FIG. 1, may be the connection ports between primary controlling FCF 106 and secondary controlling FCF 108. Extension ports (E_Ports), designated E in FIG. 1, may be the connection ports between the FC fabric 104 and the FCFs 106, 108. The components of the network 100 may contain physical ports in conjunction with the virtual ports.

Links between ports of nodes and ports of switches may be created. Links may be created between ports of FDF and FCF. All of the foregoing links may be physical links or virtual links. A virtual link may be created between the VN_Port on an ENode and the VF_Port on a FDF. Creating the virtual link requires a login operation to be performed. The VN_Port may be one of many virtual ports on a physical node port (PN_Port) (not shown). Furthermore, one or more VN_Ports may login to one or more VF_Ports.

Explicit logouts and implicit logouts are two types of logouts that disconnect physical or virtual links. An explicit logout is a deliberate logout such as when a user commands a logout. An implicit logout is a logout that occurs due to an event not explicitly commanded by a user. There are link logout events that occur that require a VF_Port to implicitly logout all the logged in VN_Ports linked to the VF_Port and de-instantiate all virtual links, which may be referred to herein as "implicit link logout events." One event that causes an implicit logout is when a VF_Port receives a login request from a VN_Port to establish a link, such as a fabric login request (FLOGI) when there are one or more existing logins associated with the VN_Port sending the FLOGI, as further discussed below. Another link logout event that may cause an implicit logout is when an ENode or a VF_Port detects a temporary physical or virtual link failure upon which implicit logout for all VN_Ports is performed.

During a first type of implicit link logout event, a FLOGI is received from a PN_Port with at least one VN_Port previously logged in. When the FLOGI is received, a VF_Port may follow a protocol that is defined by a T11 standard. The standard is set forth in T11/FC-LS-2, clause 6.4.5 or other versions of FC-LS, hereby incorporated by reference in its entirety. The protocol may require that upon receipt of a FLOGI, a VF_Port shall: (1) implicitly logout of all logged in VN_Ports, (2) disassociate logged out N_Port_IDs from the Permanent Port Name (PPN), (3) reassign one N_Port_ID to new VN_Port, and (4) set PPN of new VN_Port to the F_Port_Name in the FLOGI Link Service Acceptance (LS_ACC). The PPN is a name identifier associated with a PN_Port and its N_Port_IDs and may be the F_Port Name of the F_Port that is attached to the PN_Port.

In an alternative type of implicit link logout event, an ENode or a VF_Port detects a temporary physical or virtual link failure. When the ENode detects the link failure, a VF_Port may perform an implicit logout for all VN_Ports at the ENode. Recovery of the link requires a new FLOGI to log back into the fabric. The VF_Port may or may not have detected the temporary link failure because bridges may exist between the VF_Port and VN_Port. Bridges (not shown) may be an enhanced Ethernet switch between the ENode and the FCF. The switch is enhanced because it supports convergence features such as per priority pause, data center bridging exchange (DCBX), FCoE ACLs, or other features. If the link fails temporarily (link goes down and back up) on the ENode side of the bridge, the VF_Port may not see the link transition since it may require a significant amount of time for virtual link maintenance to detect this failure. Therefore, the VF_Port may receive a FLOGI while (from the perspective of the VF_Port) the VN_Ports from the same PN_Port are still logged in causing an implicit logout of all links between the ports. The VF_Port may perform the same protocol described above according to the T11 standard FC-LS-2. Since all of the virtual links between the VF_Port and VN_Port are logged out in either of the implicit logout events, a re-login process is needed to recover the virtual links.

Figure 2:
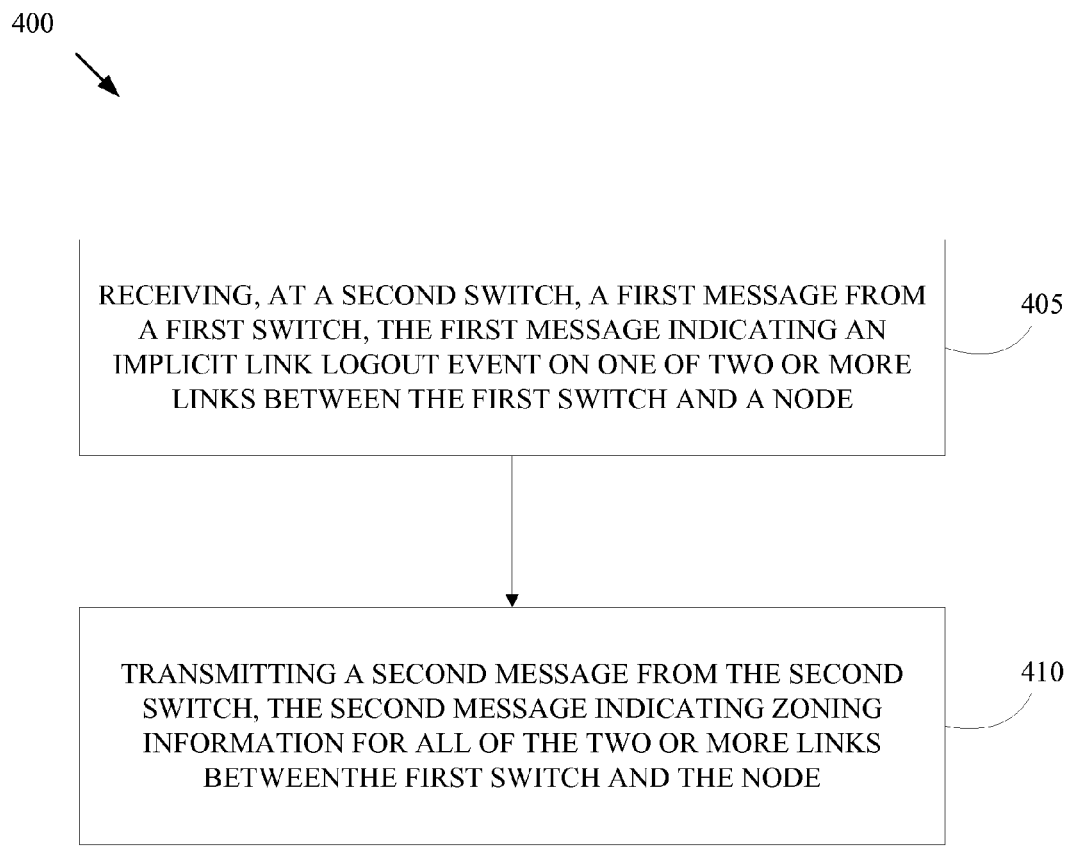
FIG. 2 is a block diagram of a process of fibre channel link logout associated with an implicit logout, according to one embodiment.

FIG. 2 is a block diagram describing a process 400 for an implicit logout of links to a fibre channel over Ethernet switch according to one embodiment. In operation 405, a second switch (FCF) may receive a first message from a first switch (FDF). The first message may indicate an implicit link logout event on one of two or more links between the first switch and a node (Enode). The first message may be VNRN where the FCF may recognize that an implicit link logout has occurred and there is a re-login or FLOGI. Otherwise the first message may be a VNUN where the N_Port_IDs of the unreachable port are batched and sent to the FCF for rezoning due to the detection of a temporary physical or virtual link failure at the node or the first switch. Upon receiving the first message, in operation 410, the second switch may transmit a second message. The second message may indicate the zoning information for all of the two or more links between the first switch and the node. The second message may be a NPZD message carrying all of the removed or added zones.

Figure 3:
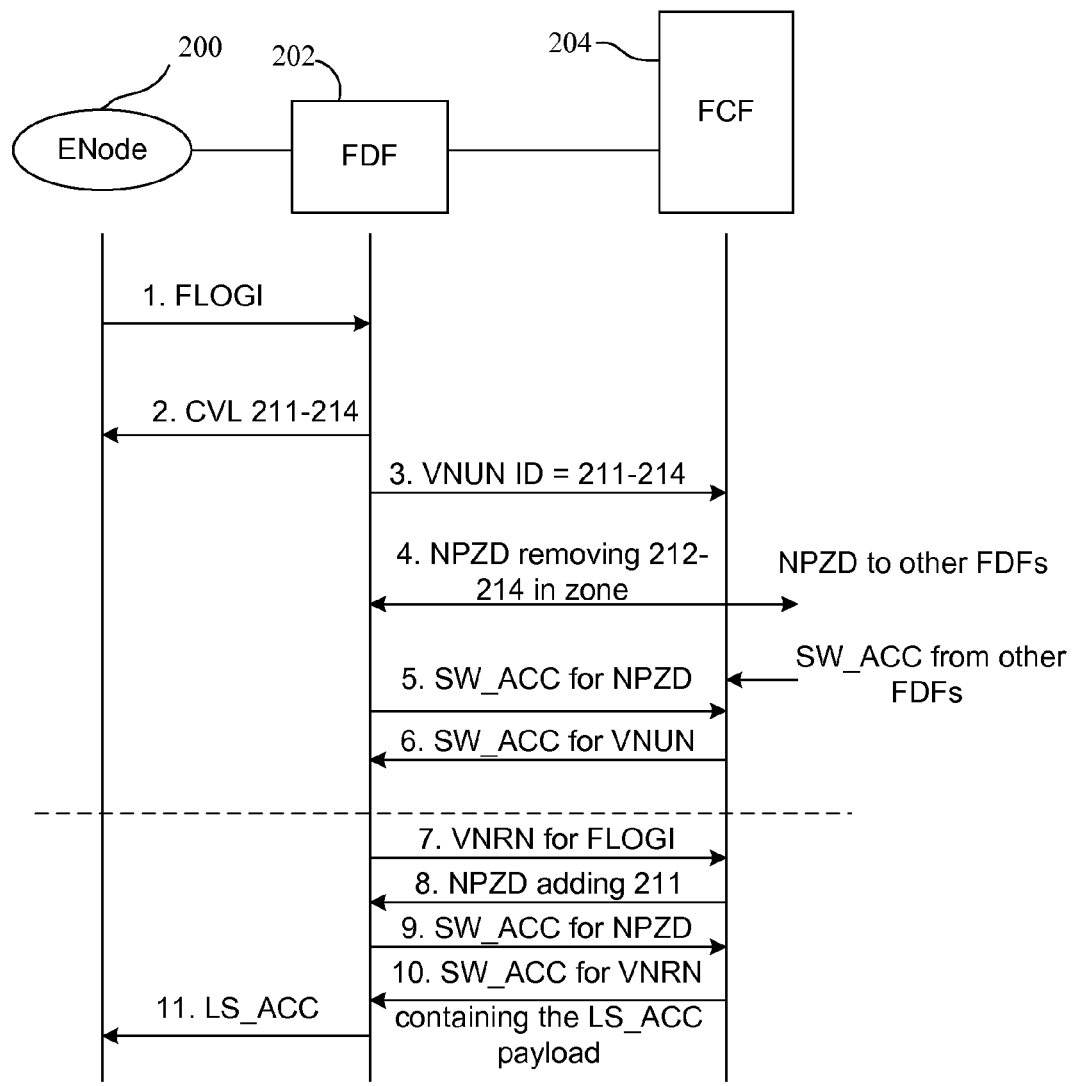
FIG. 3 is a ladder diagram illustrating various phases of an implicit logout and re-login, according to one embodiment.

FIG. 3 illustrates one embodiment of a process for an implicit logout of links between fibre channel over Ethernet switches. In FIG. 3 an ENode 200 is connected to a FDF 202, which is in turn connected to a FCF 204. The FCF 204 is illustrated as a designated or master FCF responsible for providing addresses for the virtual domain and thus acting as the principal switch for the virtual domain. The FCF 204 may be connected to other FDFs. As a precondition to the process of FIG. 3, the ENode 200 is logged in with one FLOGI followed by one or more N_Port ID Virtualization (NPIV) Discover Service Fabric Parameter (FDISCs) to instantiate one or more virtual links. In the example illustrated in FIG. 3, three NPIV FDISCs (not shown) are instantiated and assigned FC_ID 0x000212, 0x000213, and 0x000214, referenced as 212-214 in FIG. 3. The FLOGI is assigned FC_ID 0x000211, referenced 211 in FIG. 3. An implicit logout may begin at message 1 where a new FLOGI is received by the FDF 202 from the ENode 200. The new FLOGI may be sent from a PN_Port with at least one previously logged in VN_Port. The new FLOGI may also be sent due to a physical or virtual link failure detected by the ENode 200. The receipt of the new FLOGI triggers a protocol that may be defined in T11/FC-LS-2, clause 6.4.5, described above. Upon receiving the new FLOGI, the FDF 202 de-instantiates previously established virtual links by sending in message 2 a clear virtual link (CVL) to the ENode.

Messages 3-6 make up a single message cascade to perform the implicit logout for all links to the FCF. In message 3, the FDF 202 may send the complete list of depending N_Port IDs to FCF in a single VN_Port Unreachability Notification (VNUN). Alternatively, the FDF 202 may send a range of depending N_Port IDs in a single VNUN. Sending a single VNUN with the N_Port IDs for all virtual links instead of separate VNUNs for the N_Port ID for each virtual link reduces the number of messages needed to be sent between the FDF 202 and the FCF 204, which may otherwise be hundreds of messages. Thus, resources of the network 100 may be allocated for other operations and the implicit logout process may be faster. In the illustrated example, the VNUN may contain the N_Port IDs 211-214. Therefore, FCF 204 may have the complete data, all of the N_Port IDs, to create a single message 4 and only needs to compute the zoning update of the FDF one time by message 4. Providing the complete data to the FCF 204 in a single VNUN allows the amount of processing required by the FCF 204 to be more precisely controlled. Otherwise, zoning updates would be computed for each of the multiple VNUNs that would be received the FCF.

Message 4 may contain the N_Port ID and Zoning ACL Distribution (NPZD) message and also may remove N_Port IDs 211-214. The NPZD is used by the primary controlling FCF 204 to communicate to a FDF and to the secondary controlling FCF the allocation of an address identifier and its associated Zoning ACL information, or the deallocation of one or more address identifiers and their associated Zoning ACL information, or both the allocation and deallocation. Upon receiving an NPZD Request, a FDF may update its zoning enforcement according to the received Zoning ACLs only for the specified principal address identifiers. The NPZD may be sent to the FDF 202 or other FDFs.

Upon receiving message 4, the FDF 202 may send message 5 to the FCF 204. Message 5 may contain a Switch Fabric Accept (SW_ACC) for NPZD. SW_ACC indicates acceptance of the NPZD request. The FCF 204 may also receive SW_ACC from other FDFs. FCF 204 may then send message 6 to FDF 202. Message 6 may contain SW_ACC for VNUN. Message 6 may indicate the acceptance of the VNUN request.

Having a single VNUN with all N_Port IDs of the virtual links reduces the number of message cascades sent between the FDF 202 and the FCF 204, e.g., messages 3-6. The implicit logout may require only one NPZD for removing the virtual links 211-214 in the zone since there is only one VNUN. Because there is only one NPZD message is generated, only one SW_ACC of the NPZD message is required. Similarly, because only one VNUN is generated, only one SW_ACC for the VNUN message is required. Reducing the number of messages frees up additional resources for other operations of the network 100 and makes the re-login process faster.

Messages 7-11 of FIG. 3 may cover the re-login sequence for FLOGI. FDF 202 may send message 7 to FCF 204, which may contain the VN_Port Reachability Notification (VNRN) for FLOGI. FCF 204 may then send message 8 containing NPZD adding 101 in the zone of the FDF 202. FDF 202 may send message 9, which may contain the SW_ACC for NPZD to FCF 204. Message 10 may be sent from FCF 204 to FDF 202 and may contain SW_ACC for VNRN. Message 10 may also contain the Link Service Acceptance (LS_ACC) payload. FDF 202 may send the LS_ACC to the ENode 200 in message 11. When the ENode 200 receives the LS_ACC, the FLOGI may be accepted and the ENode 200 establishes a link with the FDF 202 thereby completing the re-login process.

Figure 4:
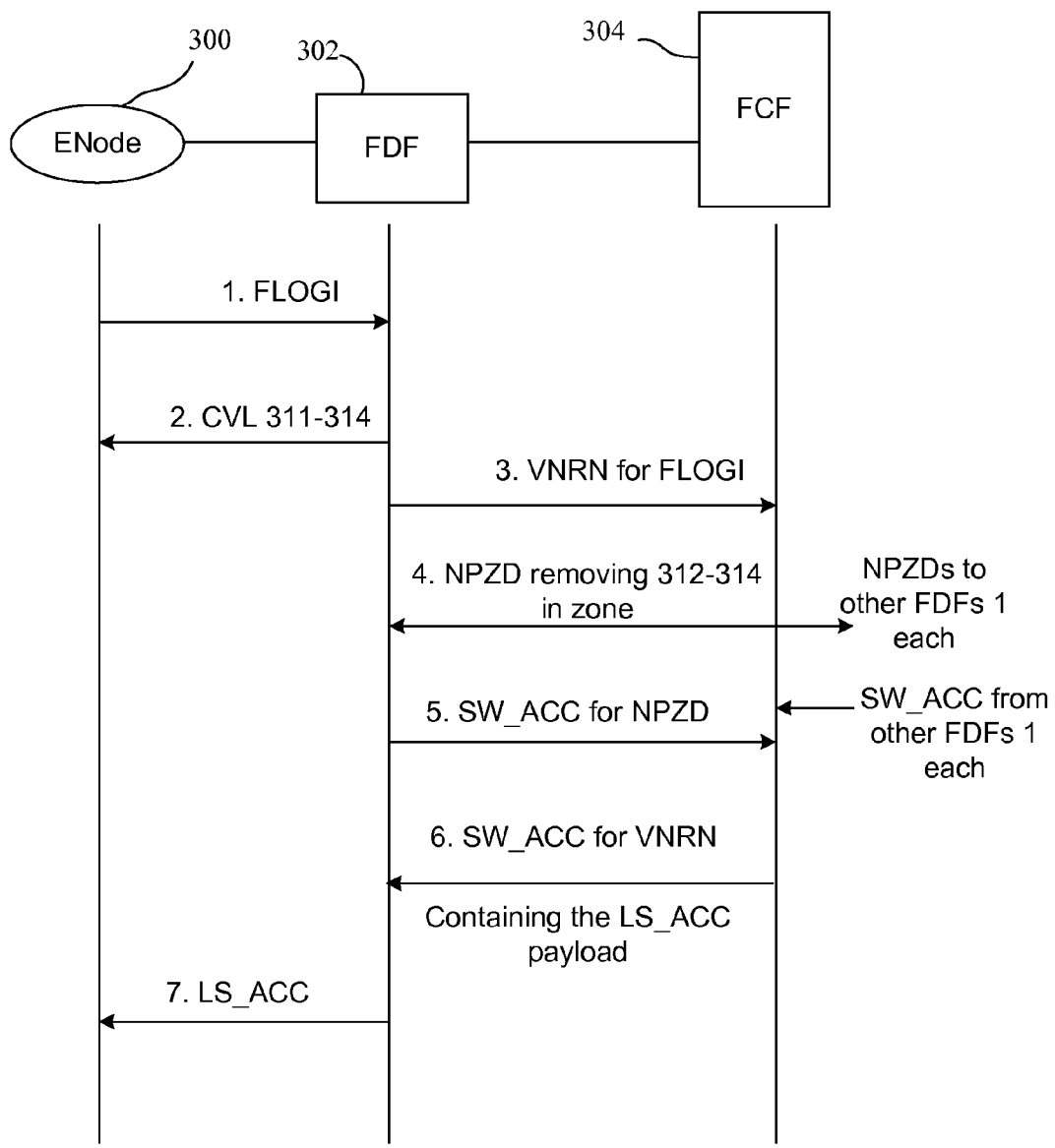
FIG. 4 is a ladder diagram illustrating various phases of an implicit logout and re-login operation, according to an alternative embodiment.

In one embodiment, illustrated in FIG. 4, an alternative implicit logout and re-login process is illustrated that removes the VNUN. In FIG. 4 an ENode 300 connects to a FDF 302, which connects to a FCF 304. The FCF 304 is illustrated as a designated or master FCF responsible for providing addresses for the virtual domain and thus acting as the principal switch for the virtual domain. The FCF 304 may connect to other FDFs. As a precondition to the process of FIG. 4, the ENode 300 is logged in with one FLOGI followed by one or more FDISCs. In the example re-login of FIG. 4 three NPIV FDISCs (not shown) are instantiated and assigned FC_ID 0x000312, 0x000313, and 0x000314, referenced as 312-314 in FIG. 4. The FLOGI is assigned FC_ID 0x000311, referenced 311 in FIG. 4. The implicit logout and re-login may begin at message 1 where the FDF 302 receives the new FLOGI from the ENode 300. The new FLOGI may be sent from a PN_Port with at least one previously logged in VN_Port. The new FLOGI may also be sent due to a physical or virtual link failure detected by the ENode 300. The receipt of the new FLOGI may trigger the logout protocal, defined in T11/FC-LS-2, clause 6.4.5, described above. Upon receiving the new FLOGI, the FDF 302 de-instantiates previous virtual links by sending in message 2 a CVL to the ENode.

Unlike the process in FIG. 3, VNUN is not used. The logout message cascade may be messages 3-6 between the FDF 302 and the FCF 304 may include the re-login messages. The logout message cascade is the series of messages sent between the FDF 302 and FCF 304 that complete the implicit logout of a link or links between the two switches. In message 3 of FIG. 4, FDF 302 forwards the new FLOGI (received from ENode 300) to FCF 304 in a VNRN. The FCF 304 recognizes the VNRN as a new FLOGI 311 as a re-login on a previously established link. The FCF tracks the interdependencies of 311-314 and determines the complete list of depending N_Port IDs. The FCF 304 may include a memory in which link identifiers for various zones are stored at the time links are initially established. The FCF 304 may determine the complete list of depending N_Port IDs by fetching the applicable link identifiers from memory. The FCF 304 uses the complete list of depending N_Port IDs to compute the entire zoning update of the FDF at one time. In message 4, the FCF 304 sends an NPZD to FDF 302 removing N_Port_ID 312-314 in the zone. FCF 304 may also send NPZDs to other FDFs. In addition, the NPZD may be a single enhanced NPZD message which removes the old 311-314 and adds a new link for the re-login 311 at the same time. Upon receiving NPZD, FDF 302 may send message 5 to FCF 304, which may include the SW_ACC for NPZD. FCF 304 may also receive SW_ACC messages from other FDFs. FCF 304 may send SW_ACC for the VNRN to FDF 302 in message 6 and the SW_ACC in message 6 may contain the LS_ACC payload. In message 7, FDF 302 may send the LS_ACC to the ENode 300. When the ENode 300 receives the LS_ACC, the FLOGI may be accepted and the ENode 300 establishes a link with the FDF 302. As may be seen from the foregoing description, the embodiment illustrated in FIG. 4 reduces the number of messages required for re-logging in the link in addition to providing the advantages described above for the embodiment illustrated in FIG. 3.

While an implicit link logout event has been described herein as either the receipt of a FLOGI by the first switch, or a temporary physical or virtual link failure detected by the node or the first switch, it will be appreciated that these are but two examples, and that an implicit link logout event may include any similar event.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A process for an implicit logout of links to a fibre channel over Ethernet switch, comprising:
    receiving, at a second switch, a first message from a first switch, the first message indicating an implicit link logout event on at least one of two or more links between the first switch and a node, each of the two or more links connecting to the node at a separate connection port on the node, the first message further indicating that all of the two or more links between the first switch and the node are to be logged out; and
    transmitting a second message from the second switch, in response to receiving the first message, the second message identifying each connection port for all of the two or more links to be logged out and indicating, within a single message, zoning information for all of the two or more links to be logged out.

2. The process of claim 1, wherein the first message is a VN_Port unreachability notification (VNUN) that identifies the two or more links between the first switch and the node.

3. The process of claim 1, wherein the first message is a VN_Port reachability notification (VNRN) that identifies a login request for a particular link associated with the implicit link logout event.

4. The process of claim 3, further comprising determining at the second switch that the login request is a re-login request, and identifying all of the two or more links between the first switch and the node when it is determined that the login request is a re-login request.

5. The process of claim 4, further comprising computing the zoning information for all of the two or more links.

6. The process of claim 3, wherein the second message is an enhanced N_Port ID and Zoning ACL Distribution (NPZD) message that logs out all of the two or more links and logs in the particular link with the single message.

7. The process of claim 1, wherein the implicit link logout event is a temporary link failure.

8. The process of claim 1, wherein the implicit link logout event is a login on a previously logged in link.

9. A process for an implicit logout of links to a fibre channel over Ethernet switch, comprising:
    detecting an implicit link logout event of a link between a first switch and a node, the first switch and the node having two or more links, each of the two or more links connecting to the node at a separate connection port on the node;
    sending a first message from the first switch to a second switch, the first message indicating an implicit link logout event of at least one of the two or more links between the first switch and a node, and indicating all of the two or more links between the first switch and the node that are to be logged out; and
    receiving a second message from the second switch at the first switch, in response to sending the first message, the second message identifying each connection port for all of the two or more links to be logged out and indicating, within a single message, zoning information for all of the two or more links to be logged out.

10. The process of claim 9, wherein the first message is a VN_Port unreachability notification (VNUN) that identifies the two or more links between the first switch and the node.

11. The process of claim 9, wherein the first message is a VN_Port reachability notification (VNRN) that identifies a login request for a particular link associated with the implicit link logout event.

12. The process of claim 11, wherein the second message is an enhanced N_Port ID and Zoning ACL Distribution (NPZD) message that logs out all of the two or more links and logs in the particular link with the single message.

13. The process of claim 9, wherein the detecting of the implicit link logout event is located at the first switch.

14. A non-transitory computer readable storage medium having instructions stored thereon which, when executed, cause a processor to perform a process for an implicit logout of links to a fibre channel over Ethernet switch, comprising:
    receiving, at a second switch, a first message from a first switch, the first message indicating an implicit link logout event on at least one of two or more links between the first switch and a node, each of the two or more links connecting to the node at a separate connection port on the node, the first message further indicating all of the two or more links between the first switch and the node are to be logged out; and transmitting a second message from the second switch, in response to receiving the first message, the second message identifying each connection port for all of the two or more links to be logged out and indicating, within a single message, zoning information for all of the two or more links to be logged out.

15. The storage medium of claim 14, wherein the first message is a VN_Port unreachability notification (VNUN) that identifies the two or more links between the first switch and the node.

16. The storage medium of claim 14, wherein the first message is a VN_Port reachability notification (VNRN) that identifies a login request for a particular link associated with the implicit link logout event.

17. The storage medium of claim 16, further comprising determining at the second switch that the login request is a re-login request, and identifying all of the two or more links between the first switch and the node when it is determined that the login request is a re-login request.

18. The storage medium of claim 17, further comprising computing the zoning information for all of the two or more links.

19. The storage medium of claim 16, wherein the second message is an enhanced N_Port ID and Zoning ACL Distribution (NPZD) message that logs out all of the two or more links and logs in the particular link with the single message.

20. The storage medium of claim 14, wherein the implicit link logout event is a temporary link failure.

21. The storage medium of claim 14, wherein the implicit link logout event is a log in on a previously logged in link.

22. A non-transitory computer readable storage medium having instructions stored thereon which, when executed, cause a processor to perform a process for an implicit logout of links to a fibre channel over Ethernet switch, comprising detecting an implicit link logout event of a link between a first switch and a node, the first switch and the node having two or more links, each of the two or more links connecting to the node at a separate connection port on the node;

sending a first message from the first switch to a second switch, the first message indicating an implicit link logout event of at least one of the two or more links between the first switch and a node, and indicating all of the two or more links between the first switch and the node that are to be logged out; and receiving a second message from the second switch at the first switch, in response to sending the first message, the second message identifying each connection port for all of the two or more links to be logged out and indicating, within a single message, zoning information for all of the two or more links to be logged out.

23. The storage medium of claim 22, wherein the first message is a VN_Port unreachability notification (VNUN) that identifies the two or more links between the first switch and the node.

24. The storage medium of claim 22, wherein the first message is a VN_Port reachability notification (VNRN) that identifies a login request for a particular link associated with the implicit link logout event.

25. The storage medium of claim 24, wherein the second message is an enhanced N_Port ID and Zoning ACL Distribution (NPZD) message that logs out all of the two or more links and logs in the particular link with the single message.

26. The process of claim 22, wherein the detecting of the implicit link logout event is located at the first switch.

* * * * *